United States Patent
Horio et al.

(10) Patent No.: US 11,207,862 B2
(45) Date of Patent: Dec. 28, 2021

(54) DECORATIVE SHEET AND DECORATIVE PLATE

(71) Applicant: Dai Nippon Printing Co., Ltd., Tokyo (JP)

(72) Inventors: Yoshiaki Horio, Tokyo (JP); Takeru Ogasawara, Tokyo (JP); Ryo Fujii, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 16/335,858

(22) PCT Filed: Sep. 28, 2017

(86) PCT No.: PCT/JP2017/035097
§ 371 (c)(1),
(2) Date: Mar. 22, 2019

(87) PCT Pub. No.: WO2018/062340
PCT Pub. Date: Apr. 5, 2018

(65) Prior Publication Data
US 2019/0248100 A1    Aug. 15, 2019

(30) Foreign Application Priority Data

Sep. 28, 2016    (JP) .............................. JP2016-190086

(51) Int. Cl.
*B32B 3/26* (2006.01)
*B32B 27/08* (2006.01)
(Continued)

(52) U.S. Cl.
CPC ................ *B32B 3/263* (2013.01); *B32B 7/12* (2013.01); *B32B 27/00* (2013.01); *B32B 27/08* (2013.01);
(Continued)

(58) Field of Classification Search
CPC .... B32B 3/26–3/263; B32B 7/00–7/14; B32B 27/00–27/42; E04F 15/00–15/225; E04B 5/00–5/48
See application file for complete search history.

(56) References Cited

U.S. PATENT DOCUMENTS 9,757,910 B2    9/2017 Manzaki
2011/0052880 A1    3/2011 Iizuka et al.
(Continued)

FOREIGN PATENT DOCUMENTS

CN    101115571 A    1/2008
CN    104185544 A    12/2014
(Continued)

OTHER PUBLICATIONS

Chattopadhyay et al. "Supercritical CO2-based Formation of Silica Nanoparticles Using Water-in-Oil Microemulsions". Industrial & Engineering Chemical Research, vol. 42, Issue 3, (2003); pp. 465-472.*

(Continued)

*Primary Examiner* — Prashant J Khatri
(74) *Attorney, Agent, or Firm* — Locke Lord LLP

(57) ABSTRACT

A decorative sheet in which squashing of an embossed shape is suppressed when bonded to an adherend, even when an embossed shape is deeply formed to improve the designability and texture of the decorative plate. More specifically, a decorative sheet having a laminate sequentially including a base material sheet, a transparent resin layer, and a surface-protecting layer in the thickness direction, wherein (1) the decorative sheet has an embossed projection and depression pattern on the surface-protecting layer side, (2) the projections of the embossed projection and depression pattern are rising portions successively connected to the depressions, and are projected from a reference plane, the reference plane being a portion of the surface of the surface-protecting layer without the embossed projection and depression pattern, and (3) the surface of the surface-protecting layer has a maximum profile peak height Rp specified in JIS B0601 (2001) of 30 μm or more.

20 Claims, 3 Drawing Sheets

(51) Int. Cl.
  *B32B 27/20* (2006.01)
  *B32B 27/32* (2006.01)
  *B32B 7/12* (2006.01)
  *B32B 27/14* (2006.01)
  *B32B 27/00* (2006.01)

(52) U.S. Cl.
  CPC .............. *B32B 27/14* (2013.01); *B32B 27/20* (2013.01); *B32B 27/32* (2013.01); *B32B 2255/10* (2013.01); *B32B 2255/26* (2013.01); *B32B 2264/102* (2013.01); *B32B 2307/412* (2013.01); *B32B 2307/538* (2013.01); *B32B 2307/732* (2013.01); *B32B 2451/00* (2013.01)

(56) References Cited

U.S. PATENT DOCUMENTS

| | | |
|---|---|---|
| 2013/0062005 A1 | 3/2013 | Iizuka et al. |
| 2015/0064404 A1 | 3/2015 | Manzaki |
| 2018/0186132 A1 | 7/2018 | Ikeda et al. |

FOREIGN PATENT DOCUMENTS

| | | |
|---|---|---|
| EP | 3098071 A1 | 11/2016 |
| JP | 2007-204666 A | 8/2007 |
| JP | 2008-221693 A | 9/2008 |
| JP | 2009-023549 A | 2/2009 |
| JP | 2016-052785 A | 4/2016 |
| JP | 2016-064629 A | 4/2016 |
| WO | 2006/086231 A1 | 8/2006 |
| WO | 2015/105168 A1 | 7/2015 |
| WO | 2016/076360 A1 | 5/2016 |

OTHER PUBLICATIONS

International Search Report dated Dec. 12, 2017, issued for PCT/JP2017/035097.

Supplementary Extended European Search Report dated Mar. 20, 2020, issued for the corresponding European patent application No. 17856289.8.

Office Action dated Jun. 23, 2020 for the corresponding CN patent application No. 201780059218.6 and an English translation thereof.

\* cited by examiner

DECORATIVE SHEET AND DECORATIVE PLATE

TECHNICAL FIELD

The present invention relates to a decorative sheet and a decorative plate.

BACKGROUND ART

Designability is conventionally required for interior materials used for the interior of buildings, and decorative plates are used as such interior materials. In particular, the surfaces of decorative plates used for floor surfaces require both designability and scratch resistance.

In Western culture, walking with shoes on inside residences etc. is common; therefore, low-pressure melamine floors are mainly used for room floors in Western countries, in consideration of scratch resistance. However, low-pressure melamine floors have drawbacks such that walking sounds are likely to reverberate, and that the texture thereof is hard and cold.

In recent years, floors (so-called hybrid floors) obtained by bonding decorative sheets of vinyl chloride resin (vinyl chloride-based decorative sheets) to chipboards, typified by cork, which is generally used as an adherend (decorative plate base material), have been used in place of low-pressure melamine floors. Chipboards are base materials obtained by mechanically grinding lumber waste, bark, and small-diameter logs discarded in saw mills, building scrap wood discarded in demolition and construction sites, and the like, to form chips; and performing compression molding on the chips together with a synthetic resin adhesive to mold them into plates.

Due to the use of chipboards as adherends, such hybrid floors are excellent in that they are environmentally friendly, have sound insulation and heat insulation effects, and have a soft texture. Furthermore, when they are bonded to decorative sheets, color variation during installation is suppressed. In Europe, however, decorative plates that do not contain vinyl chloride-based resins have been required, in consideration of environmental problems.

As decorative plates that do not contain vinyl chloride-based resins, in Japan, decorative plates in which decorative sheets containing, for example, an olefin-based resin are bonded to adherends are used. However, when such a decorative sheet is bonded to an adherend, such as a chipboard, to form a decorative plate, surface unevenness of the adherend appears on the surface of the decorative sheet, causing a problematic uneven surface of the decorative plate and a reduction in designability (unevenness appearing on the surface of the decorative sheet due to surface unevenness of the adherend is also referred to in Japanese as "daku"). Moreover, when the smoothness of the surface of the decorative plate is enhanced by a method to increase the thickness of the decorative sheet, the increased thickness of the decorative sheet reduces emboss-forming properties; and if the embossed shape becomes shallow, designability is undesirably reduced.

To solve these problems, for example, Patent Literature 1 (PTL 1) discloses a decorative sheet comprising a base material sheet, and at least a transparent resin layer and a surface-protecting layer sequentially laminated on the base material sheet, the decorative sheet comprising at least a backer layer laminated on the back surface of the base material sheet, wherein (1) the surface of the decorative sheet has a ten-point mean roughness Rzjis of 40 μm or more;
(2) the surface-protecting layer contains an ionizing radiation-curable resin;
(3) the base material sheet, the transparent resin layer, and the backer layer each contain a non-halogen-based thermoplastic resin;
(4) the backer layer has a thickness of 120 to 250 μm;
(5) the backer layer has a Martens hardness of 50 to 80 $N/mm^2$; and
(6) the backer layer is laminated by extrusion molding of a backer layer-forming resin composition in a molten state on the back surface of the base material sheet.

When the decorative sheet disclosed in PTL 1 is bonded to an adherend, such as a chipboard, to form a decorative plate, the occurrence of daku is suppressed, excellent emboss-forming properties are obtained, and squashing of embossing is suppressed when the sheet is bonded to an adherend.

CITATION LIST

Patent Literature

PTL 1: JP2016-64629A

SUMMARY OF INVENTION

Technical Problem

Although decorative sheets on their own have excellent designability and texture when an embossed shape is deeply formed thereon to improve the designability and texture of decorative plates, the deep embossed shape is squashed when the sheets are bonded to adherends, undesirably making it impossible to obtain desired designability and texture.

Accordingly, an object of the present invention is to provide a decorative sheet in which squashing of an embossed shape is suppressed when bonded to an adherend, even when an embossed shape is deeply formed to improve the designability and texture of the decorative plate; and to provide a decorative plate that uses the decorative sheet.

Solution to Problem

As a result of extensive research, the present inventors found that the above object can be achieved by a decorative sheet comprising a laminate sequentially including a base material sheet, a transparent resin layer, and a surface-protecting layer in the thickness direction; and having a specific embossed projection and depression pattern on the surface-protecting layer side. The present invention has thus been completed.

More specifically, the present invention relates to the following decorative sheet and decorative plate.

1. A decorative sheet comprising a laminate sequentially including a base material sheet, a transparent resin layer, and a surface-protecting layer in the thickness direction, wherein
(1) the decorative sheet has an embossed projection and depression pattern on the surface-protecting layer side,
(2) projections of the embossed projection and depression pattern are rising portions successively connected to depressions, and are projected from a reference plane, the reference plane being a portion of the surface of the surface-protecting layer without the embossed projection and depression pattern, and (3) the surface of the surface-protecting layer has a maximum profile peak height Rp specified in JIS B0601 (2001) of 30 µm or more.

2. The decorative sheet according to Item 1, wherein the surface of the surface-protecting layer has a ten-point mean roughness Rzjis specified in JIS B0601 (1994) of 50 µm or more.

3. The decorative sheet according to Item 2, wherein the surface of the surface-protecting layer has a ratio of a mean width of roughness profile elements RSm specified in JIS B0601 (2001) to the Rzjis, RSm/Rzjis, of 20 or less.

4. The decorative sheet according to any one of Items 1 to 3, which satisfies a range of 0.4t≤d≤t, wherein t represents a thickness of the decorative sheet, and d represents a depth of the embossed projection and depression pattern.

5. The decorative sheet according to any one of Items 1 to 4, wherein
1) the surface-protecting layer, when consisting of a single layer, contains fine particles having a particle size greater than the thickness of the single layer, and
2) the surface-protecting layer, when consisting of a multilayer, contains fine particles having a particle size greater than the thickness of the uppermost surface layer of the multilayer.

6. The decorative sheet according to Item 5, wherein the fine particles are in a form of a vesicle formed by a supercritical reverse phase evaporation method.

7. The decorative sheet according to any one of Items 1 to 6, wherein the surface-protecting layer has a total thickness of 15 µm or more.

8. The decorative sheet according to any one of Items 1 to 7, wherein the surface-protecting layer contains an ionizing radiation-curable resin.

9. The decorative sheet according to any one of Items 1 to 8, wherein the base material sheet and the transparent resin layer contain a non-halogen-based thermoplastic resin.

10. The decorative sheet according to Item 9, wherein the non-halogen-based thermoplastic resin is an olefin-based thermoplastic resin.

11. A decorative plate comprising a laminate sequentially including a decorative plate base material and a decorative sheet in the thickness direction, wherein
(1) the decorative sheet comprises a laminate sequentially including a base material sheet, a transparent resin layer, and a surface-protecting layer in the thickness direction,
(2) the decorative sheet has an embossed projection and depression pattern on the surface-protecting layer side,
(3) projections of the embossed projection and depression pattern are rising portions successively connected to depressions, and are projected from a reference plane, the reference plane being a portion of the surface of the surface-protecting layer without the embossed projection and depression pattern, and
(4) the surface of the surface-protecting layer has a maximum profile peak height Rp specified in JIS B0601 (2001) of 30 µm or more.

12. The decorative plate according to Item 11, wherein the decorative plate base material is at least one member selected from the group consisting of medium-density wood fiberboards, high-density wood fiberboards, particleboards, coniferous tree plywood, broadleaf tree plywood, fast-growing tree plywood, cork sheets, cork-containing composite base materials, and thermoplastic resin base materials.

Advantageous Effects of Invention

The decorative sheet of the present invention is characterized by comprising a laminate sequentially including a base material sheet, a transparent resin layer, and a surface-protecting layer in the thickness direction, wherein
(1) the decorative sheet has an embossed projection and depression pattern on the surface-protecting layer side,
(2) the projections of the embossed projection and depression pattern are rising portions successively connected to the depressions, and are projected from a reference plane, the reference plane being a portion of the surface of the surface-protecting layer without the embossed projection and depression pattern, and
(3) the surface of the surface-protecting layer has a maximum profile peak height Rp specified in JIS B0601 (2001) of 30 µm or more.

Due to these characteristics, squashing of the embossed shape is suppressed even when the decorative sheet having a deep embossed shape to improve the designability and texture of a decorative plate is bonded to an adherend. Therefore, excellent designability and excellent texture are obtained by the embossed projection and depression pattern not only in the decorative sheet state, but also in the decorative plate state. Such decorative sheet and decorative plate of the present invention are useful as a decorative sheet and decorative plate for floor materials.

DESCRIPTION OF EMBODIMENTS

1. Decorative Sheet

The decorative sheet of the present invention is characterized by comprising a laminate sequentially including a base material sheet, a transparent resin layer, and a surface-protecting layer in the thickness direction, wherein
(1) the decorative sheet has an embossed projection and depression pattern on the surface-protecting layer side,
(2) the projections of the embossed projection and depression pattern are rising portions successively connected to the depressions, and are projected from a reference plane, the reference plane being a portion of the surface of the surface-protecting layer without the embossed projection and depression pattern, and
(3) the surface of the surface-protecting layer has a maximum profile peak height Rp specified in JIS B0601 (2001) of 30 µm or more.

In the decorative sheet of the present invention having the above characteristics, squashing of the embossed shape is suppressed even when the decorative sheet having a deep embossed shape to improve the designability and texture of a decorative plate is bonded to an adherend. Therefore, excellent designability and excellent texture are obtained by the embossed projection and depression pattern not only in the decorative sheet state, but also in the decorative plate state. Such decorative sheet and decorative plate of the present invention are useful as a decorative sheet and decorative plate for floor materials.

The decorative sheet of the present invention comprises a laminate sequentially including a base material sheet, a transparent resin layer, and a surface-protecting layer in the thickness direction. The specific structure (layer structure) of the decorative sheet is not limited as long as the decorative sheet has a predetermined shape of an embossed projection and depression pattern on the surface-protecting layer side.

Figure 3:
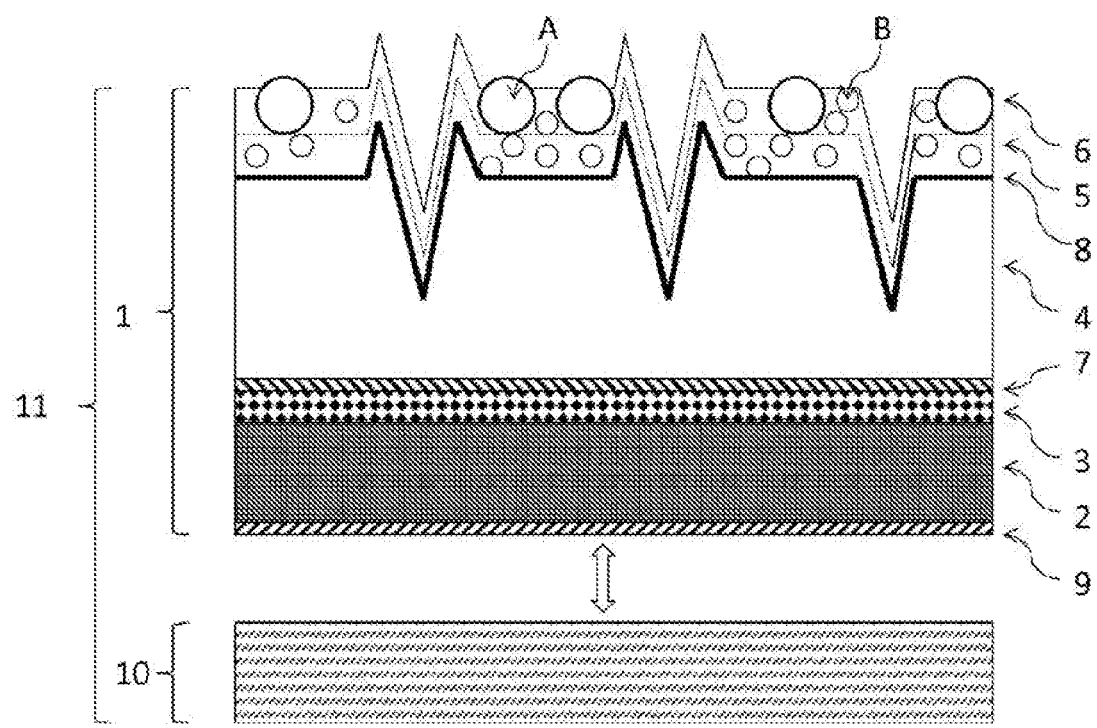
FIG. 3 is a cross-sectional view schematically showing an example of the constituent materials of the decorative plate of the present invention.

In a specific embodiment, for example, the decorative sheet comprises a base material sheet, and a picture pattern layer, a transparent adhesive layer, a transparent resin layer, a primer layer, and a surface-protecting layer sequentially laminated on the base material sheet; and further comprises a back-surface primer layer on the back surface of the base material sheet (the embodiment of the decorative sheet 1 shown in FIG. 3). Although not shown in FIG. 3, the decorative sheet may further optionally comprise a gloss-adjusting layer.

In this specification, a direction viewed from the base material sheet where the surface-protecting layer is laminated is referred to as "above" or "the front surface," and a direction viewed from the base material sheet where the back-surface primer layer is laminated is referred to as "below" or "the back surface." "The front surface (side)" or "the surface on the surface-protecting layer (side)" of the decorative sheet or the decorative plate means the surface of the decorative sheet or the decorative plate to be viewed after the installation thereof. Below, the side of the surface-protecting layer may also be abbreviated as "the surface-protecting layer side."

Below, the decorative sheet is described with reference to the drawings.

Figure 1:
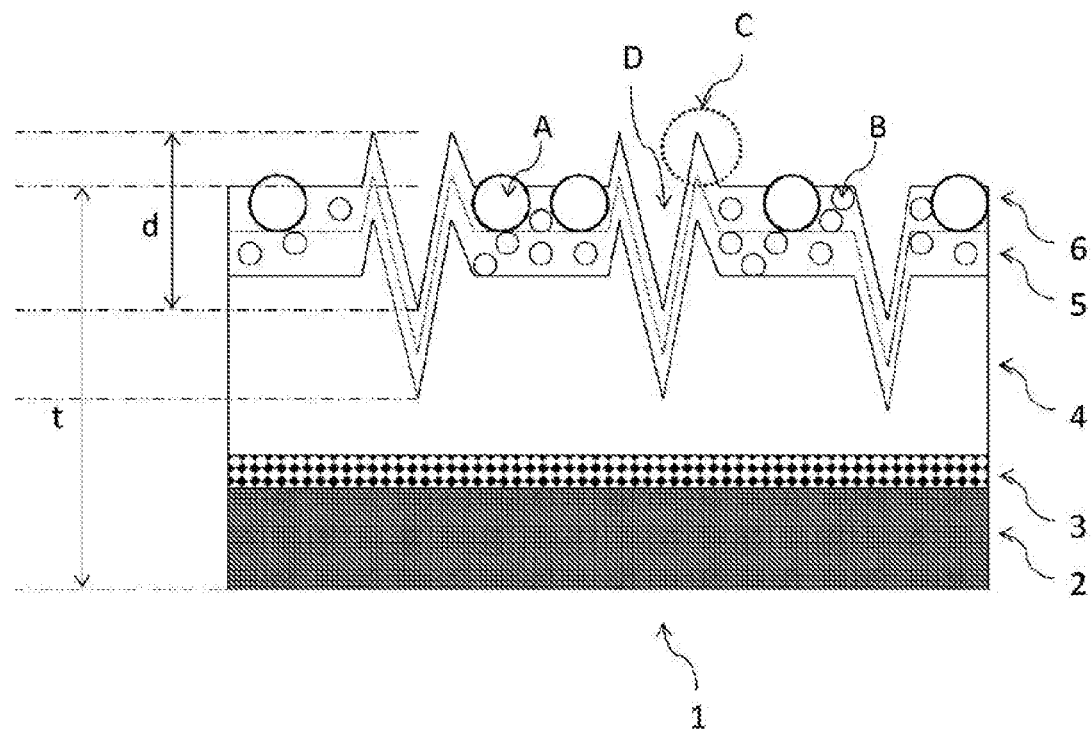
FIG. 1 is a cross-sectional view schematically showing an example of the decorative sheet of the present invention.

FIG. 1 is a cross-sectional view showing an example of the decorative sheet of the present invention. The decorative sheet 1 shown in FIG. 1 comprises a base material sheet 2, and a picture pattern layer 3, a transparent resin layer 4, and surface-protecting layers (5, 6) laminated on the base material sheet 2; and has an embossed projection and depression pattern on the surface-protecting layer side. In the embossed projection and depression pattern, the projection C is a rising portion successively connected to the depression D; and is projected from a reference plane, which is a surface (flat portion) of the surface-protecting layer. Although details are described later, the surface-protecting layer may consist of a single layer, or two or more layers. FIG. 1 shows one embodiment in which the surface-protecting layer consists of two different layers, i.e., an upper layer and a lower layer (the surface-protecting layers 5, 6).

The following are details of each layer constituting the decorative sheet of the present invention. Below, upper and lower limits of numerical ranges indicated with numerals before and after "to" mean that the lower limit is X or more, and the upper limit is Y or less. For example, the phrase "α to β" means that the numerical range is α or more, and β or less.

Base Material Sheet

The base material sheet is a layer on the surface (front surface) of which a picture pattern layer etc. are sequentially laminated. The base material sheet preferably contains a non-halogen-based thermoplastic resin; however, the material of the base material sheet is not limited.

Examples of such non-halogen-based thermoplastic resins include olefin-based thermoplastic resins, such as low-density polyethylene (including linear low-density polyethylene), medium-density polyethylene, high-density polyethylene, ethylene-α-olefin copolymers, homopolypropylene, polymethylpentene, polybutene, ethylene-propylene copolymers, propylene-butene copolymers, ethylene-vinyl acetate copolymers, saponified products of ethylene-vinyl acetate copolymers, and mixtures thereof; thermoplastic ester-based resins, such as polyethylene terephthalate, polybutylene terephthalate, polyethylene naphthalate, polyethylene naphthalate-isophthalate copolymers, polycarbonate, and polyarylate; acrylic thermoplastic resins, such as polymethyl (meth)acrylate, polyethyl (meth)acrylate, polyethyl acrylate, and polybutyl acrylate; polyamide-based thermoplastic resins, such as Nylon-6 and Nylon-66; polyimide, polyurethane, polystyrene, acrylonitrile-butadiene-styrene resins; etc. These non-halogen-based thermoplastic resins may be used singly, or in a combination of two or more. Among these, olefin-based thermoplastic resins are preferred in terms of the excellent printability of the picture pattern layer, excellent embossing suitability, and inexpensiveness.

The base material sheet may be colored. In this case, the base material sheet can be colored by adding a colorant (pigment or dye) to a non-halogen-based thermoplastic resin mentioned above. Examples of colorants include inorganic pigments, such as titanium dioxide, carbon black, and iron oxide; organic pigments, such as phthalocyanine blue; and various dyes. One or more such colorants may be selected from known or commercially available products. The amount of colorant(s) may be determined according to the desired color etc.

The base material sheet may contain various additives, such as fillers, matting agents, foaming agents, flame retardants, lubricants, antistatic agents, antioxidants, ultraviolet absorbers, and light stabilizers, as required.

The thickness of the base material sheet is preferably 40 to 100 μm. If the thickness of the base material sheet is less than 40 μm, any unevenness of the decorative plate base material cannot be sufficiently prevented from appearing on the surface of the decorative plate. If the thickness of the base material sheet exceeds 100 μm, curliness occurs when the decorative sheet is stored in a rolled state, thereby making it difficult to perform roll laminating. The thickness of the base material sheet is more preferably 60 to 80 μm. The base material sheet may consist of a single layer or a multilayer.

The surface (front surface) of the base material sheet may be subjected to a corona discharge treatment in order to increase the adhesion of the ink that forms the picture pattern layer. Methods and conditions for the corona discharge treatment may be determined according to known methods. If necessary, a corona discharge treatment may also be performed on the back surface of the base material sheet; or a back-surface primer layer, described later, may be formed.

Picture Pattern Layer

The picture pattern layer is an optional layer that gives a desired picture (design) to the decorative sheet; and the type etc. of picture are not limited. Examples thereof include wood grain patterns, leather patterns, marble grain patterns, pebbly patterns, tiled patterns, brick-masonry patterns, textile patterns, geometric figures, characters, symbols, and abstraction patterns.

The method of forming the picture pattern layer is not particularly limited. For example, the picture pattern layer may be formed on the surface of the base material sheet by a printing method that uses ink obtained by dissolving (or dispersing) a known colorant (dye or pigment) together with a binding resin in a solvent (or a dispersion medium). The ink can be an aqueous composition, in terms of reducing the VOC of the decorative sheet.

Examples of colorants include inorganic pigments, such as carbon black, titanium white, zinc white, red oxide, Berlin blue, and cadmium red; organic pigments, such as azo pigments, lake pigments, anthraquinone pigments, quinacridone pigments, phthalocyanine pigments, isoindolinone pigments, and dioxazine pigments; metallic powder pigments, such as aluminium powder and bronze powder; pearlescent pigments, such as titanium oxide-coated mica and bismuth chloride oxide; fluorescent pigments; noctilucent pigments; and the like. Such colorants may be used singly, or in a combination of two or more. These colorants may be used in combination with a filler (e.g., silica), an extender pigment (e.g., organic beads), a neutralizer, a surfactant, etc.

Examples of binding resins include hydrophilized polyester-based urethane resins, which can be used in combination with polyesters, polyacrylates, polyvinyl acetate, polybutadiene, polyvinyl chloride, chlorinated polypropylene, polyethylene, polystyrene, polystyrene-acrylate copolymers, rosin derivatives, alcohol adducts of styrene-maleic anhydride copolymers, cellulose-based resins, etc. Specific examples include polyacrylamide-based resins, poly(meth)acrylate-based resins, polyethylene oxide-based resins, poly N-vinyl-pyrrolidone-based resins, water-soluble polyester-based resins, water-soluble polyamide-based resins, water-soluble amino-based resins, water-soluble phenol-based resins, and other water-soluble synthetic resins; polynucleotides, polypeptides, polysaccharides, and like water-soluble natural polymers; etc. Other examples include natural rubber, synthetic rubber, polyvinyl acetate-based resins, (meth)acrylic-based resins, polyvinyl chloride-based resins, modified polyurethane-polyacrylic-based resins, etc., mixtures of natural rubber and the like mentioned above, and other resins. These binding resins can be used singly, or in a combination of two or more.

Examples of the solvent (or dispersion medium) include petroleum-based organic solvents, such as hexane, heptane, octane, toluene, xylene, ethylbenzene, cyclohexane, and methylcyclohexane; ester-based organic solvents, such as ethyl acetate, butyl acetate, acetic acid-2-methoxyethyl, and acetic acid-2-ethoxyethyl; alcohol-based organic solvents, such as methyl alcohol, ethyl alcohol, normal propyl alcohol, isopropyl alcohol, isobutyl alcohol, ethylene glycol, and propylene glycol; ketone-based organic solvents, such as acetone, methyl ethyl ketone, methyl isobutyl ketone, and cyclohexanone; ether-based organic solvents, such as diethyl ether, dioxane, and tetrahydrofuran; chlorine-based organic solvents, such as dichloromethane, carbon tetrachloride, trichloroethylene, and tetrachloroethylene; inorganic solvents, such as water; and the like. These solvents (or dispersion media) can be used singly, or in a combination of two or more.

Examples of the printing method for forming the picture pattern layer include gravure printing, offset printing, screen printing, flexo printing, electrostatic printing, inkjet printing, etc. When a solid-like picture pattern layer is formed over the entire surface, various coating methods, such as roll coating, knife coating, air-knife coating, dye coating, lip coating, comma coating, kiss coating, flow coating, and dip coating, can be used. In addition to the above, usable examples include hand-drawing methods, marbling methods, photographic methods, transfer methods, laser beam drawing methods, electron beam drawing methods, metal partial deposition methods, etching methods, etc. Such methods may be used in combination with other methods.

The thickness of the picture pattern layer is not particularly limited, and can be suitably determined according to product characteristics. The layer thickness is about 1 to 15 µm.

Transparent Resin Layer

The transparent resin layer is not particularly limited, as long as it is transparent. Any of colorless transparent, colored transparent, and semitransparent is included. The transparent resin layer preferably contains a non-halogen-based thermoplastic resin; however, the materials of the transparent resin layer is not limited. In the decorative sheet of the present invention, the thickness of the transparent resin layer is equal to the thickness T1 shown in FIG. 2, and is the average of ten thickness values of the transparent resin layer measured based on the cross-sectional photograph of the decorative sheet.

Examples of such non-halogen-based thermoplastic resins include olefin-based thermoplastic resins, such as low-density polyethylene (including linear low-density polyethylene), medium-density polyethylene, high-density polyethylene, ethylene-α-olefin copolymers, homopolypropylene, polymethylpentene, polybutene, ethylene-propylene copolymers, propylene-butene copolymers, ethylene-vinyl acetate copolymers, saponified products of ethylene-vinyl acetate copolymers, and mixtures thereof; thermoplastic ester-based resins, such as polyethylene terephthalate, polybutylene terephthalate, polyethylene naphthalate, polyethylene naphthalate-isophthalate copolymers, polycarbonate, and polyarylate; acrylic thermoplastic resins, such as polymethyl methacrylate, polyethyl methacrylate, polyethyl acrylate, and polybutyl acrylate; polyamide-based thermoplastic resins, such as Nylon-6 and Nylon-66; polyimide, polyurethane, polystyrene, acrylonitrile-butadiene-styrene resins; etc. These non-halogen-based thermoplastic resins may be used singly, or in a combination of two or more. Among these, olefin-based thermoplastic resins are preferred in terms of excellent embossing suitability and inexpensiveness.

The transparent resin layer may be colored, as long as it is transparent.

As long as the transparent resin layer is transparent, the transparent resin layer may contain various additives, such as flame retardants, lubricants, antistatic agents, antioxidants, ultraviolet absorbers, and light stabilizers, as required.

The thickness of the transparent resin layer is preferably, but not limited to, 40 µm or more and 300 µm or less, more preferably 80 µm or more and 200 µm or less, and most preferably 80 µm or more and 120 µm or less. When the thickness of the transparent resin layer is within the above range, effects are easily obtained, such that a deep embossing is formed, and scratch formation or shaving caused by abrasion of the picture pattern layer (called egara torare in Japanese) are suppressed.

Surface-Protecting Layer

Figure 2:
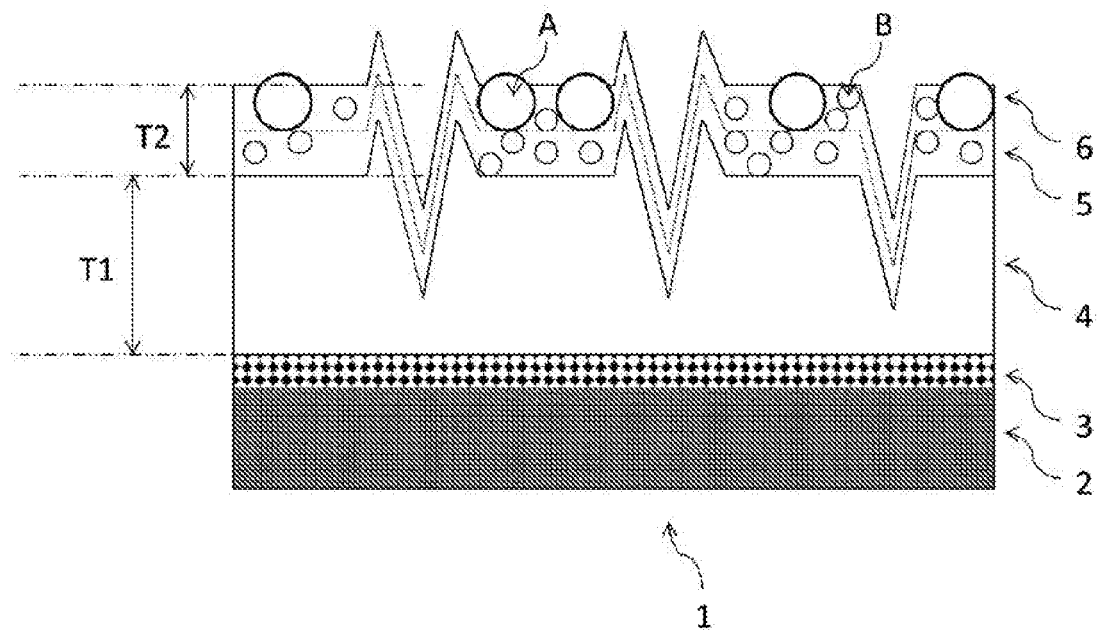
FIG. 2 is a cross-sectional view schematically showing an example of the decorative sheet of the present invention.

The decorative sheet of the present invention comprises a surface-protecting layer formed on the surface thereof. In the present invention, the thickness of the surface-protecting layer is equal to the thickness T2 shown in FIG. 2. When the surface-protecting layer consists of two layers, i.e., the surface-protecting layer 5 (lower layer) and the surface-protecting layer 6 (upper layer), as shown in FIG. 2, the thickness is the total thickness of both layers. T2 is preferably 15 µm or more, and more preferably 20 to 40 µm. Here, T2 is the average of ten thickness values of portions in which fine particles described later having a particle size greater than the thickness of the surface-protecting layer are not present. Such a thickness of the surface-protecting layer can be defined based on the cross-sectional photograph of the decorative sheet, as in the transparent resin layer. When the surface-protecting layer consists of three or more layers, the thickness of the surface-protecting layer is equal to the total thickness of each thickness of the three or more layers.

When the decorative sheet of the present invention has a gloss-adjusting layer described later, the surface-protecting layer is formed adjacent to the gloss-adjusting layer. More specifically, the back surface of the surface-protecting layer is adjacent to the gloss-adjusting layer. When the decorative sheet of the present invention has a gloss-adjusting layer, the surface-protecting layer is preferably transparent.

The surface-protecting layer preferably contains fine particles having a particle size greater than the thickness of the surface-protecting layer (fine particles A). The fine particles A function as an additive for enhancing the scratch resistance of the surface-protecting layer. In this specification, it can be confirmed by an SEM (scanning electron microscope) that the particle size of the fine particles A is greater than the thickness of the surface-protecting layer. For example, it can be confirmed by cutting the decorative sheet in a direction perpendicular to the surface thereof, and observing the part of the surface-protecting layer of the obtained cross-section using an SEM (scanning electron microscope). When confirming the fine particles A using an SEM, one or more fine particles A are preferably present in the observation of the length of 200 µm.

The particle size of the fine particles A is not particularly limited as long as it is greater than the thickness of the surface-protecting layer. If the particle size of the fine particles A is equal to or less than the thickness of the surface-protecting layer, the scratch resistance of the surface-protecting layer is not sufficient.

The particle size of the fine particles A is preferably 15 to 50 µm, and more preferably 20 to 45 µm. If the particle size of the fine particles A is overly large, they may be easily removed from the surface-protecting layer.

The content of the fine particles A is preferably 5 to 30 parts by mass based on 100 parts by mass of the resin component of the surface-protecting layer. If the content of the fine particles A is too high, when projecting portions of the fine particles A are rubbed and shaved, gloss appears on the rubbed portions and is noticeable; and scratch resistance is not sufficient. In contrast, if the content of the fine particles A is too low, the scratch resistance of the surface-protecting layer is not sufficient. The content of the fine particles A is preferably 5 parts by mass or more and 30 parts by mass or less, and more preferably 10 parts by mass or more and 20 parts by mass or less, based on 100 parts by mass of the resin component of the surface-protecting layer.

In the present specification, the particle size of the fine particles A can be measured by an SEM (scanning electron microscope). For example, the particle size can be measured by cutting the decorative sheet in a direction perpendicular to the surface thereof, photographing any part of the obtained cross-section of the surface-protecting layer using an SEM (scanning electron microscope), and averaging the particle size (diameter) of the photographed fine particles A.

The surface-protecting layer may consist of a single layer, or a multilayer. When the surface-protecting layer consists of a multilayer, the layer that is located at the frontmost side (the uppermost surface layer) preferably contains the fine particles A as shown in FIGS. 1 and 2, and the fine particles A here preferably have a particle size that is 2 to 10 µm greater than the thickness of the uppermost surface layer. The content of the fine particles A in this case is preferably 5 parts by mass or more and 30 parts by mass or less, and more preferably 10 parts by mass or more and 20 parts by mass or less, based on 100 parts by mass of the resin component of the uppermost surface layer.

To suppress gloss appearance caused by rubbing, the surface-protecting layer may contain fine particles (fine particles B) that have a particle size equal to or less than the thickness of the surface-protecting layer, in addition to the fine particles A. The method of confirming the fine particles B in the surface-protecting layer and the method of measuring the particle size thereof are the same as those for fine particles A. The content of the fine particles B is preferably 5 parts by mass or more, and 30 parts by mass or less based on 100 parts by mass of the resin component of the surface-protecting layer (the layer that contains the fine particles B when the surface-protecting layer consists of a multilayer).

The fine particles A and B are not particularly limited, as long as they can impart scratch resistance to the surface-protecting layer depending on the particle size, and have a matte effect. Known fine particles can be used. Examples of the fine particles A and B include inorganic particles, such as silica fine particles and silicone resin; organic particles, such as crosslinked alkyl, crosslinked styrene, benzoguanamine resin, urea-formaldehyde resin, phenolic resin, polyethylene, and nylon; and the like. Among these, silica fine particles are preferred.

Although it is not limited thereto, the surface-protecting layer preferably contains an ionizing radiation-curable resin or a two-component curable urethane-based resin as the resin component. It is preferable that the surface-protecting layer be substantially formed of these resins. When the surface-protecting layer is formed of one or more ionizing radiation-curable resins or one or more two-component curable urethane-based resins, the abrasion resistance, impact resistance, stain resistance, scratch resistance, weather resistance, and the like of the decorative sheet can be easily enhanced. Among these, ionizing radiation-curable resins are more preferred.

Ionizing radiation-curable resins are not particularly limited. Usable examples thereof include transparent resins comprising, as a main component, one or more prepolymers (including oligomers) and/or one or more monomers that contain, in the molecule, a radically polymerizable double bond that can undergo the crosslinking polymerization reaction by irradiation of ultraviolet rays, electron beams, or like ionizing radiation. These prepolymers or monomers can be used singly, or in a combination of two or more. The curing reaction is generally conducted through a crosslinking curing reaction.

Specific examples of the prepolymers or monomers include compounds that contain, in the molecule, a radically polymerizable unsaturated group, such as a (meth)acryloyl group or (meth)acryloyloxy group; a cation-polymerizable functional group, such as an epoxy group; etc. Furthermore, polyene/thiol-based prepolymers comprising polyene and polythiol in combination are also preferable. In this specification, a (meth)acryloyl group means an acryloyl group or a methacryloyl group.

Examples of prepolymers comprising a radically polymerizable unsaturated group include polyester (meth)acrylate, urethane (meth)acrylate, epoxy (meth)acrylate, melamine (meth)acrylate, triazine (meth)acrylate, silicone (meth)acrylate, and the like. It is preferable that such prepolymers generally have a molecular weight of about 250 to 100000.

Examples of monomers comprising a radically polymerizable unsaturated group include monofunctional monomers, such as methyl(meth)acrylate, 2-ethylhexyl(meth) acrylate, phenoxyethyl(meth)acrylate, and the like.

Moreover, examples of multifunctional monomers include diethylene glycol di(meth)acrylate, propylene glycol di(meth)acrylate, trimethylolpropane tri(meth)acrylate, trimethylolpropane ethylene oxide tri(meth)acrylate, dipentaerythritol tetra(meth)acrylate, dipentaerythritol penta(meth)acrylate, dipentaerythritol hexa(meth)acrylate, and the like.

Examples of prepolymers comprising a cation-polymerizable functional group include prepolymers of epoxy-based resins, such as bisphenol-type epoxy resins and novolac-type epoxy compounds; and prepolymers of vinyl ether-based resins, such as fatty acid-based vinyl ethers and aromatic vinyl ethers. Examples of thiols include polythiols, such as trimethylolpropane trithioglycolate, and pentaerythritol tetrathioglycolate. Examples of polyenes include polyurethanes formed of diol and diisocyanate, wherein an allyl alcohol is added to each end thereof.

Electromagnetic waves or charged particles with sufficient energy to activate a curing reaction of the molecules in the ionizing radiation-curable resin (composition) are usable as the ionizing radiation to cure the ionizing radiation-curable resin. Ultraviolet rays or electron beams are generally used, and visible light, X-rays, ionic rays, and the like may also be used.

The two-component curable urethane-based resins are not particularly limited. Usable examples thereof include those comprising a polyol component having a hydroxy group (e.g., acrylic polyol, polyester polyol, polyether polyol, epoxy polyol,) as a main compound; and an isocyanate component (e.g., tolylene diisocyanate, hexamethylene diisocyanate, meta-xylene diisocyanate), which functions as a curing agent component.

The resins listed above can be used singly, or in a combination of two or more.

In order to improve weather resistance, the surface-protecting layer preferably contains an ultraviolet absorber, such as a benzotriazole ultraviolet absorber, a benzophenone ultraviolet absorber, a salicylate ultraviolet absorber, or a triazine ultraviolet absorber. When the resin layer is cured by irradiation with ultraviolet rays, a photoinitiator and a photopolymerization accelerator (sensitizer) can be used. Examples of photoinitiators include acetophenones, benzophenones, Michler's benzoyl benzoate, α-aminoxime ester, tetramethylthiuram monosulfide, thioxanthones, aromatic diazonium salts, aromatic sulfonium salts, metallocene, etc. Examples of photopolymerization accelerators (sensitizers) include n-butylamine, triethylamine, tri-n-butylphosphine, etc.

Further, an antibacterial agent may be added to the surface-protecting layer in order to impart antibacterial properties. Examples of antibacterial agents include inorganic antibacterial agents and organic antibacterial agents. In particular, inorganic antibacterial agents are preferred because they generally have higher safety than, and durability and heat resistance superior to, organic antibacterial agents. Inorganic antibacterial agents are those in which antibacterial metals, including silver, copper, zinc, etc., are supported by various inorganic supports. The amount of antibacterial agent added is preferably 0.1 to 10 parts by mass based on 100 parts by mass of the resin component.

The surface-protecting layer may further contain various additives, such as solvents, colorants (e.g., dyes and pigments), fillers (e.g., extenders), antifoaming agents, leveling agents, thixotropy-imparting agents, and flame retardants, as required.

The surface-protecting layer can be formed, for example, by applying an ionizing radiation-curable resin or a two-component curable urethane-based resin to the transparent resin layer or a gloss-adjusting layer, described later, by a known coating method, such as gravure coating or roll coating; and then curing the resin.

The gloss value of the surface-protecting layer can be adjusted, for example, by a method to select the type of each of the substances, such as resin components and additives, contained in the surface-protecting layer; or a method to suitably determine the content of each of these substances.

Embossed Shape

The decorative sheet of the present invention has an embossed projection and depression pattern on the surface-protecting layer side. The projections of the embossed projection and depression pattern are rising portions successively connected to the depressions, and are projected from a reference plane, the reference plane being a portion of the surface of the surface-protecting layer without the embossed projection and depression pattern. The maximum profile peak height Rp, as specified in JIS B0601 (2001), obtained by measuring the surface roughness of the decorative sheet is 30 μm or more.

Therefore, squashing of the embossed shape is suppressed even when the decorative sheet having a deep embossed shape to improve the designability and texture of a decorative plate is bonded to an adherend. Although the decorative sheet of the present invention must have the embossed projection and depression pattern that satisfies the above requirement, it is not necessary for the entire embossed projection and depression pattern to satisfy the above requirement, and the embossed projection and depression pattern may partially contain portions that do not have projections.

Figure 4:
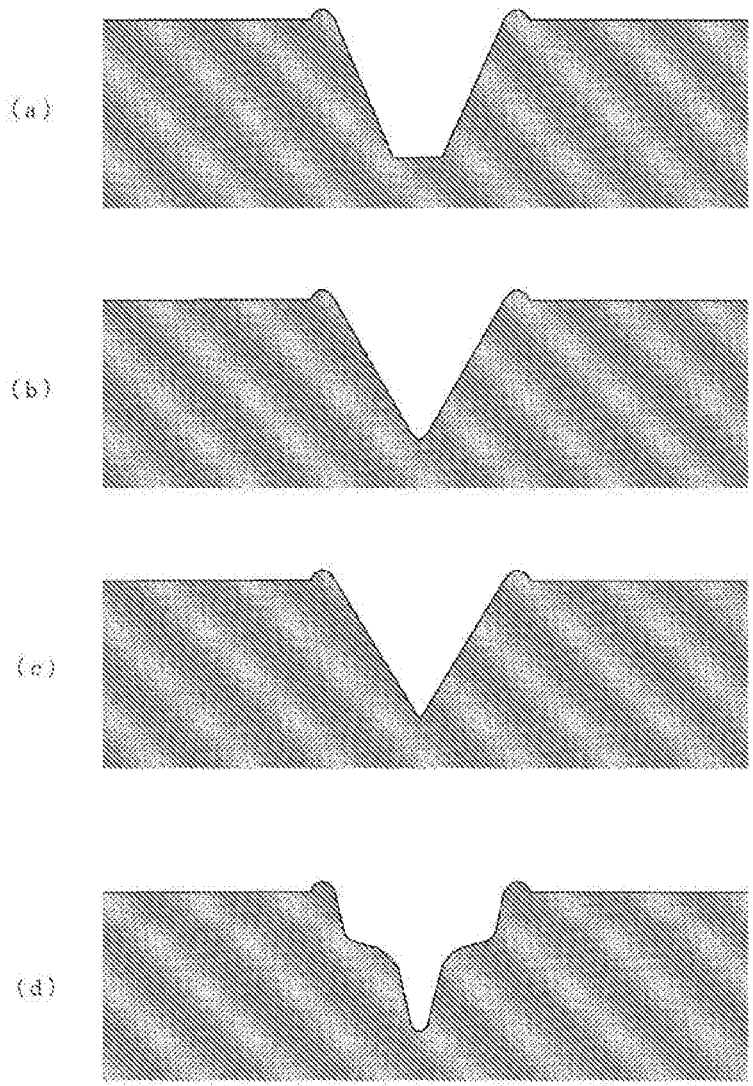
FIG. 4 is a cross-sectional view schematically showing examples of embossed projection and depression pattern shapes (a) to (d) of the decorative sheet of the present invention.

The cross-sectional shape of the embossed projection and depression pattern depends on the type of the projection and depression pattern, and the surface properties of the embossing plate. Typical cross-sectional shapes are schematically shown in (a) to (d) of FIG. 4 as examples. The embossed projection and depression pattern shown in FIG. 4(a) has a flat bottom. The embossed projection and depression pattern shown in (b) has a round bottom. The embossed projection and depression pattern shown in (c) has a triangular bottom. The embossed projection and depression pattern shown in (d) has a round bottom, and the middle of the depression is roundly broadened. The shapes (a) to (d) all have a projection (a rising portion successively connected to the depression) projected from the flat surface (reference plane) of the surface-protecting layer.

In the decorative sheet of the present invention, the maximum peak height Rp, specified in JIS B0601 (2001), obtained by measuring the surface roughness of the surface of the surface-protecting layer is 30 μm or more. In particular, the maximum peak height Rp is preferably 30 μm or more, and 100 μm or less. When Rp is within this range, squashing of the embossed shape is suppressed even when the decorative sheet having a deep embossed shape to improve the designability and texture of a decorative plate is bonded to an adherend. Therefore, excellent designability and excellent texture are obtained by the embossed projection and depression pattern not only in the decorative sheet state, but also in the decorative plate state.

Further, in the decorative sheet of the present invention, the ten-point mean roughness Rzjis of the surface of the surface-protecting layer, specified in JIS B0601 (1994), is preferably 50 μm or more; and more preferably 50 μm or more, and 150 μm or less. When Rzjis is within this range, excellent effects can be easily obtained in terms of designability and texture.

Additionally, it is preferable to satisfy the range $0.4t \leq d \leq t$, and more preferably $0.5t \leq d \leq t$, wherein t represents the thickness of the decorative sheet (as shown in FIG. 1, t represents the distance from the base material sheet to the flat surface of the surface-protecting layer), and d represents the depth of the embossed projection and depression pattern (d is a maximum height Rz specified in JIS B0601 (2001)). This range indicates that the embossed projection and depression pattern is relatively deep, relative to the thickness of the decorative sheet. When the relationship between t and d satisfies the above range, excellent designability and excellent texture are easily obtained.

Furthermore, in the decorative sheet of the present invention, the surface of the surface-protecting layer preferably has a ratio of the mean width of roughness profile elements RSm specified in JIS B0601 (2001) to the Rzjis, RSm/Rzjis, of 20 or less; and more preferably 5 or more, and 15 or less. When the ratio RSm/Rzjis is within this range, an effect is easily obtained such that the texture has a more noticeable feeling (i.e., the depth of the embossed projection and depression pattern, and the projection-depression intervals appropriately provide texture that has a nicely noticeable feeling).

The embossing method is not particularly limited. In a preferable method, for example, the front surface of the surface-protecting layer is softened by heating; and pressed and shaped using an embossing plate, followed by cooling.

The embossing is conducted using a known sheet-fed or rotary embossing machine. Examples of depression shapes include wood-grain vessel patterns, stone sheet surface concave-convex patterns (granite cleavage planes etc.), textile surface textures, matte patterns, grain patterns, hairline patterns, linear streak patterns, etc.

The following describes layers other than the base material sheet, picture pattern layer, transparent resin layer, and surface-protecting layer of the decorative sheet according to the specific embodiments described in detail above.

Transparent Adhesive Layer

In order to increase the adhesion between the transparent resin layer and the picture pattern layer, a transparent adhesive layer may be formed on the picture pattern layer. The transparent adhesive layer is not particularly limited, as long as it is transparent. Any of colorless transparent, colored transparent, and semitransparent is included.

The adhesive is not particularly limited, and any adhesive known in the field of decorative sheets can be used. Examples of adhesives known in the field of decorative sheets include thermoplastic resins, such as polyamide resin, acrylic resin, and vinyl acetate resin; thermosetting resins, such as urethane-based resin; and the like. These adhesives can be used singly, or in a combination of two or more. It is also possible to use a two-component curable polyurethane resin containing isocyanate as a curing agent or a polyester resin.

Although the thickness of the transparent adhesive layer is not particularly limited, the thickness is about 0.1 to 30 μm, and preferably about 1 to 20 μm.

Primer Layer

A primer layer may be provided on the transparent resin layer. The primer layer can be formed by applying a known primer agent to the surface of the transparent resin layer. Examples of primer agents include urethane resin primer agents comprising an acrylic-modified urethane resin (an acrylic urethane resin), etc., primer agents comprising a urethane-cellulose resin (e.g., a resin obtained by adding hexamethylene diisocyanate to a mixture of urethane and nitrocellulose), resin primer agents comprising a block copolymer of acrylic and urethane, and the like. Additives may be added to the primer agent, as required. Examples of additives include fillers, such as calcium carbonate and clay; flame retardants, such as magnesium hydroxide; antioxidants; lubricants; foaming agents; ultraviolet absorbers; light stabilizers; etc. The amount of additives can be suitably determined according to product characteristics.

The thickness of the primer layer is not particularly limited, but is generally about 0.01 to 10 μm, and preferably about 0.1 to 1 μm.

Gloss-Adjusting Layer

The decorative sheet of the present invention may have a gloss-adjusting layer.

When the decorative sheet of the present invention has a gloss-adjusting layer, the gloss-adjusting layer is formed on the transparent resin layer so as to be adjacent to the surface-protecting layer. More specifically, the back surface of the gloss-adjusting layer is adjacent to the front surface of the transparent resin layer (or the primer layer when the decorative sheet of the present invention has the primer layer).

In terms of designability, the gloss-adjusting layer may be formed (1) in part of the front surface (the surface of the decorative sheet or the decorative plate to be viewed after the installation thereof), or (2) in the entire front surface (entire surface). That is, the gloss-adjusting layer may be formed (1) partially on the front surface, or (2) entirely on the front surface.

Here, the gloss value of the gloss-adjusting layer is represented by $G_A$, and the gloss value of the surface-protecting layer is represented by $G_P$. When the decorative sheet of the present invention has a gloss-adjusting layer, the relationship between the gloss value $G_A$ of the gloss-adjusting layer and the gloss value $G_P$ of the surface-protecting layer is $G_P \neq G_A$. The values $G_A$ and $G_P$ in the present specification are measured according to Japanese Industrial Standard JIS Z8741. Specifically, in the present invention, the gloss value is measured by a gloss meter (PG-3D, produced by Nippon Denshoku Industries Co., Ltd.) at an incident angle of 60°. In the present specification, the gloss value (tsuya chi, in Japanese) is also called "koutaku chi" or "gurosu chi" in Japanese.

When (1) the gloss-adjusting layer is formed in part of the front surface, or when (2) the gloss-adjusting layer is formed on the entire front surface, the gloss-adjusting layer and the surface-protecting layer are both viewed from the surface of the decorative sheet or the decorative plate to be viewed after the installation thereof, and the relationship between the gloss value of the gloss-adjusting layer and the gloss value of the surface-protecting layer is $G_P \neq G_A$. Therefore, when the decorative sheet of the present invention is bonded to an adherend, the influence of unevenness (daku) formed on the surface of the decorative sheet is further suppressed, and the designability of the decorative sheet or the decorative plate is enhanced. Accordingly, the decorative sheet of the present invention having a gloss-adjusting layer is a preferable embodiment of the present invention.

Next, the case (1) where the gloss-adjusting layer is formed in part of the front surface (this case is also simply referred to as "the case (1)") is described. In the case (1), it is preferable that the ratio of the area of a region in which the gloss-adjusting layer is formed, per $cm^2$ of the area of the front surface of the decorative sheet or the decorative plate be 20 to 80%. In this case, it is preferable that the gloss-adjusting layer be formed so that the front surface (the surface to be viewed) of the gloss-adjusting layer has a picture pattern. When the gloss-adjusting layer has a picture pattern, and the above-mentioned area ratio is 20 to 80%, the gloss difference between the gloss-adjusting layer and the surface-protecting layer is more significant, and designability is consequently enhanced. In addition, it is possible to further suppress the influence of unevenness. When the gloss-adjusting layer is formed to have a picture pattern, the type of picture pattern is not particularly limited. Examples of the specific type of picture pattern include the same picture patterns mentioned above as examples of the picture pattern layer.

In the present specification, the ratio of the area of a region in which the gloss-adjusting layer is formed (a region in which the gloss-adjusting layer is present), per $cm^2$ of the area of the front surface of the decorative sheet or the decorative plate, is also referred to as "the occupancy area ratio of the gloss-adjusting layer." The occupancy area ratio of the gloss-adjusting layer is calculated from plate-making data in the stage of producing a plate for forming the gloss-adjusting layer. The occupancy area ratio of the gloss-adjusting layer can also be calculated from the shape of the plate.

In the case (1), in order to further suppress the influence of unevenness (in order to make it further difficult to recognize unevenness), the relationship between $G_A$ and $G_P$ is preferably $G_A<G_P$, and more preferably $G_A<G_P$ and $G_A \leq 5$.

The method for forming the gloss-adjusting layer is not particularly limited. For example, similar to the picture pattern layer described above, the gloss-adjusting layer can be formed from ink obtained by dissolving (or dispersing) a known colorant (a dye, a pigment, etc.), a vehicle, etc., in a solvent (or a dispersion medium). The colorant and the solvent can be the same colorant and solvent mentioned above as examples of the colorant and solvent in the picture pattern layer.

The vehicle for the ink for forming the gloss-adjusting layer is preferably one containing 50 mass % or more of urethane-based resin and/or polyvinyl acetal-based resin. Examples of urethane-based resins include urethane resins obtained by reacting a polyol component, which is a polyol, such as acrylic polyol, polyester polyol, or polyether polyol, and an isocyanate component, which is an isocyanate, such as an aromatic isocyanate (e.g., tolylene diisocyanate, xylene diisocyanate, or diphenylmethane diisocyanate), or an aliphatic or alicyclic isocyanate (e.g., isophorone diisocyanate, hexamethylene diisocyanate, or hydrogenated tolylene diisocyanate) (both linearly crosslinked resins and mesh-like crosslinked resins can be used). Moreover, polyvinyl acetal-based resins are obtained by condensation (acetalization) of polyvinyl alcohols and aldehydes. Examples of polyvinyl acetal resins include polyvinyl formal (formal resin), polyvinyl acetoacetal, polyvinyl propional, polyvinyl butyral (butyral resin), polyvinyl hexylal, and the like. Among these, polyvinyl butyral is particularly preferred because it is soluble in a solvent and easily formed into ink, and provides an excellent feeling of visual unevenness (visual recognition as recesses).

Further, in order to adjust the gloss value, a gloss-control resin, such as an unsaturated polyester resin, an acrylic resin, or a vinyl chloride-vinyl acetate copolymer, may be mixed, as required. When a gloss-control resin is used, the mixing ratio thereof is preferably within the range of 10 to 50 mass %, based on the total weight of the vehicle. The ink forming the gloss-adjusting layer may be colorless; or colored by adding a colorant, such as a pigment.

Further, an extender pigment may be mixed in the ink for forming the gloss-adjusting layer. When an extender pigment is mixed, scattering of light can be promoted, and the effect of removing unevenness (daku) can be further enhanced. The extender pigment is not particularly limited. For example, it is suitably selected from silica, talc, clay, barium sulfate, barium carbonate, calcium sulfate, calcium carbonate, magnesium carbonate, etc. Preferred among these is silica, which is a material that has a high degree of freedom in material design, including oil absorbency, particle size, pore volume, etc., and that has excellent designability, whiteness, and coating stability as ink; silica fine particles are particularly preferred. When an extender pigment is used, the content thereof is preferably 5 to 15 parts by mass based on 100 parts by mass of the ink (ink composition) other than the extender pigment.

The gloss value $G_A$ of the gloss-adjusting layer can be adjusted, for example, by a method to select the type of each of the substances, such as the above-mentioned vehicle, gloss-control resin, and colorant (including an extender pigment); or a method to suitably determine the content of each of these substances.

Examples of the printing method for forming the gloss-adjusting layer include gravure printing, offset printing, screen printing, flexo printing, electrostatic printing, inkjet printing, etc., similar to the printing method for forming the picture pattern layer mentioned above. Moreover, when a solid-like gloss-adjusting layer is formed on the entire surface, the same coating methods used to form the picture pattern layer can be used.

When the gloss-adjusting layer is formed in part of the front surface (in the case (1)), it is preferable that the gloss-adjusting layer have a picture pattern. In particular, it is more preferable that the gloss-adjusting layer be formed in a pattern shape, such as a dot, lattice, or wood-grain vessel pattern (shape). Because the gloss-adjusting layer is formed in the above pattern, a further difference is made between the gloss of a region in which the gloss-adjusting layer is present and the gloss of a region other than the gloss-adjusting layer (a region in which the gloss-adjusting layer is not present). As a result, an optical illusion of recesses is generated, and such an optical illusion is recognized as a unique cubic effect. Therefore, unevenness (daku) is much less noticeable.

When the picture pattern layer is formed in the decorative sheet of the present invention, it is preferable that a gloss-adjusting layer be formed so as to be linked (synchronized) with the pattern of the picture pattern layer. For example, when the picture pattern layer is formed in a wood-grain pattern, a decorative sheet having more excellent designability can be obtained by forming a gloss-adjusting layer by pattern-printing of a wood-grain vessel pattern.

The thickness (film thickness) of the gloss-adjusting layer is preferably 0.5 μm to 5 μm, in consideration of printability and interaction with the surface-protecting layer-forming resin composition.

Back-Surface Primer Layer

A back-surface primer layer may be formed on the back surface (surface opposite to the surface on which the picture pattern layer is laminated) of the base material sheet, as required. The back-surface primer layer is effective, for example, when the base material sheet and a decorative plate base material are bonded together to form a decorative plate.

The back-surface primer layer can be formed by applying a known primer agent to the base material sheet. Examples of primer agents include urethane resin primer agents comprising an acrylic-modified urethane resin (an acrylic urethane resin), etc., primer agents comprising a urethane-cellulose resin (e.g., a resin obtained by adding hexamethylene diisocyanate to a mixture of urethane and nitrocellulose), resin primer agents comprising a block copolymer of acrylic and urethane, and the like. Additives may be added to the primer agent, as required. Examples of additives include fillers, such as calcium carbonate and clay, flame retardants, such as magnesium hydroxide, antioxidants, lubricants, foaming agents, ultraviolet absorbers, light stabilizers, etc. The amount of additives can be suitably determined according to product characteristics.

The thickness of the back-surface primer layer is not particularly limited. The thickness is generally about 0.01 to 10 μm, and preferably about 0.1 to 1 μm.

Forming Various Additives Contained in Each Layer of Decorative Sheet into Vesicles The various additives to be added to the layers of the decorative sheet of the present invention described above (such as an inorganic filler or the like to be added to the surface-protecting layer) are preferably formed into vesicles. Examples of the method for forming various additives into vesicles are not particularly limited, and known methods may be used to form the vesicles. Among various methods, the supercritical reverse phase evaporation method is preferable.

The supercritical reverse phase evaporation method is specifically explained below. The supercritical reverse phase evaporation method refers to a method of adding an aqueous phase containing various additives as water-soluble or hydrophilic encapsulation materials to a mixture in which a material for forming the outer membrane of the vesicle is evenly dissolved in carbon dioxide in a supercritical state or carbon dioxide at a temperature or a pressure condition equal to or greater than the supercritical point, thereby forming a capsule-like vesicle in which the various additives as encapsulation materials are encapsulated with a single membrane. "Carbon dioxide in a supercritical state" refers to carbon dioxide in a supercritical state at a temperature equal to or greater than the critical temperature (30.98° C.), and a pressure equal to or greater than the critical pressure (7.3773±0.0030 MPa); and "carbon dioxide at a temperature or a pressure condition equal to or greater than the critical point" refers to carbon dioxide under a condition in which only the critical temperature or only the critical pressure exceeds the critical condition. This method can produce a single-walled lamellar vesicle having a diameter of 50 to 800 nm. "Vesicle" is the general name of a folliculus having a spherically closed membrane structure containing a liquid phase. In particular, those having an outer membrane formed of a biological lipid such as a phospholipid are called liposomes.

Examples of phospholipids include phosphatidylcholine, phosphatidylethanolamine, phosphatidylserine, phosphatidic acid, phosphatidylglycerol, phosphatidylinositol, cardiolipin, egg yolk lecithin, hydrogenated egg yolk lecithin, soybean lecithin, hydrogenated soybean lecithin, and like glycerophospholipids; and sphingomyelin, ceramide phosphorylethanolamine, ceramide phosphorylglycerol, and like sphingophospholipids.

Other examples of the materials constituting the outer layer also include nonionic surfactants; and dispersants, such as a mixture of these surfactants and cholesterols or triacylglycerols.

Examples of nonionic surfactants include one or more members selected from polyglycerolether, dialkylglycerol, polyoxyethylene hardened castor oil, polyoxyethylene alkylether, polyoxyethylene sorbitan fatty acid ester, sorbitan fatty acid ester, polyoxyethylene polyoxypropylene copolymers, polybutadiene-polyoxyethylene copolymers, polybutadiene-poly2-vinylpyridine, polystyrene-polyacrylic acid copolymers, polyethylene oxide-polyethyl ethylene copolymers, polyoxyethylene-polycaprolactam copolymers, and the like.

Examples of the cholesterols include one or more members selected from cholesterol, α-cholestanol, β-cholestanol, cholestane, desmosterol (5,24-cholestadiene-3β-ol), sodium cholate, cholecalciferol, and the like.

The outer membrane of the liposome may be formed from a mixture of a phospholipid and a dispersant. By forming an outer layer as a liposome formed of a phospholipid, the decorative sheet of the present invention ensures desirable compatibility between the resin composition, which is the main component of each layer, and various additives.

2. Decorative Plate

The decorative plate of the present invention comprises a laminate sequentially including a decorative plate base material and a decorative sheet in the thickness direction. The decorative plate is characterized by the following.

(1) The decorative sheet comprises a laminate sequentially including a base material sheet, a transparent resin layer, and a surface-protecting layer in the thickness direction, (2) the decorative sheet has an embossed projection and depression pattern on the surface-protecting layer side, (3) the projections of the embossed projection and depression pattern are rising portions successively connected to the depressions, and are projected from a reference plane, the reference plane being a portion of the surface of the surface-protecting layer without the embossed projection and depression pattern, and (4) the surface of the surface-protecting layer has a maximum profile peak height Rp specified in JIS B0601 (2001) of 30 μm or more.

FIG. 3 shows an example of a decorative plate in which a decorative sheet 1 of the present invention is laminated on a decorative plate base material 10 (the decorative plate base material 10 is bonded to a surface opposite to the surface-protecting layer side).

The decorative plate base material is, but not limited to, at least one member selected from medium-density wood fiberboards, high-density wood fiberboards, particleboards, coniferous tree plywood, broadleaf tree plywood, fast-growing tree plywood, cork sheets, cork-containing composite base materials, thermoplastic resin sheets (base plates containing polyvinyl chloride resin, polypropylene resin, polyethylene resin, acrylic resin, etc., as its main component); and the like.

Examples of coniferous trees include Sakhalin fir, Japanese larch, Yezo spruce, Japanese cedar, hinoki cypress, pine, sequoia, Hondo spruce, and the like. Examples of broadleaf trees include lauan, Japanese linden, birch, castor aralia, Japanese beech, oak, meranti, and the like. Examples of fast-growing trees include poplar, falcata, acacia, Kamerere, eucalyptus, Terminalia, and the like.

When a plywood, such as a coniferous tree plywood, broadleaf tree plywood, or fast-growing tree plywood, is used, the number of stacked plywood layers (number of plies) is not limited. It is usually preferable that the number of plies be 3 to 7, and more preferably 5 to 7. The adhesive used at the time of producing plywood is also not limited. Known woodworking adhesives may be widely used. Examples of adhesives include adhesives containing, as an active ingredient, polyvinyl acetate, polyvinyl chloride, vinyl chloride-vinyl acetate copolymers, ethylene-acrylic acid copolymers, ionomers, butadiene-acrylic nitrile rubber, neoprene rubber, natural rubber, or the like. Examples also include heat-curable adhesives, such as melamine-based adhesives, phenol-based adhesives, urea-based (vinyl acetate-urea-based) adhesives, and the like.

The cork sheet is not particularly limited, as long as it can impart good walking feel when the decorative material is used for floors (a floor material). For the cork sheet itself, various commercially available products can be used.

As the cork sheet used in the present invention, any of so-called natural cork and synthetic cork can be used. Natural cork is a highly elastic material produced by peeling and processing the phellem of cork oak bark. Synthetic cork is produced by imitating natural cork.

The density of the cork sheet is preferably about 0.1 to 0.5 g/cm$^3$, and more preferably about 0.2 to 0.5 g/cm$^3$.

In view of imparting good walking feel to the decorative material, the cork sheet preferably has a thickness of 1.5 mm or more, and more preferably about 2.0 to 2.5 mm.

The cork sheet may be a single layer, or may be a laminate of multiple cork sheets having different elastic moduli and/or densities.

Examples of the cork-containing composite base material include composite materials obtained by laminating and bonding a cork sheet to a different material (e.g., a medium-density wood fiberboard, a high-density wood fiberboard), and the like.

The thickness of the decorative plate base material is not limited. The thickness is preferably about 2 to 15 mm, and more preferably about 2 to 12 mm.

The method for laminating the decorative sheet and the decorative plate base material is not limited. For example, the decorative sheet can be bonded to the decorative plate base material using an adhesive. The adhesive may be suitably selected from known adhesives according to the type etc. of the adherend. Examples thereof include polyvinyl acetate, polyvinyl chloride, vinyl chloride-vinyl acetate copolymer, ethylene-acrylic acid copolymer, ionomer, butadiene-acrylonitrile rubber, neoprene rubber, natural rubber, and the like. These adhesives can be used singly, or in a combination of two or more. The present invention also encompasses an invention of a method for producing a decorative plate, the method comprising the step of sequentially laminating at least the decorative sheet of the present invention on a decorative plate base material, so that the layer structure satisfies this order.

The thus-produced decorative plate can be used, for example, for interior materials of buildings, such as walls, ceilings, and floors; exterior materials, such as balconies and verandas; surface decorative plates of fittings, such as sashes, doors, and balustrades, and furniture; surface decorative plates of cabinets of light electrical appliances and office automation equipment; or the like. In particular, the decorative plate can be suitably used as a floor decorative material.

EXAMPLES

The present invention is described in detail below with reference to Examples, Comparative Examples, and Test Examples. However, the present invention is not limited to the Examples.

Example 1

A 60-μm-thick polypropylene film was prepared as a base material sheet. A back-surface primer layer (2 μm in thickness) was formed on the back surface of the base material sheet, and a 2-μm-thick picture pattern layer was formed by gravure printing on the front surface of the base material sheet. A 2-μm-thick transparent adhesive layer comprising a urethane-based resin was formed on the picture pattern layer. A 100-μm-thick transparent polypropylene-based resin sheet was laminated on the adhesive layer by an extrusion lamination method, thereby forming a transparent resin layer.

Subsequently, the surface was subjected to a corona discharge treatment, and then coated with a two-component curable urethane-based resin, thereby forming a primer layer (surface-protecting layer-forming primer layer; thickness: 2 μm).

The front surface of the primer layer was multilayer-coated with a urethane acrylate-based electron beam-curable resin (EB resin) by a gravure coating method so that the thickness after curing was 30 μm (lower layer: 15 μm; and upper layer: 15 μm). Then, the electron beam-curable resin was cured by irradiation with an electron beam using an electron beam irradiation device in an environment with an oxygen concentration of 200 ppm or less at an acceleration voltage of 175 KeV with a dose of 5 Mrad, thereby forming a surface-protecting layer.

The electron beam-curable resin used for forming the lower layer contained silica fine particles (particle size: 6 μm) having a particle size equal to or less than the coating film thickness in an amount of 30 parts by mass based on 100 parts by mass of the electron beam-curable resin. Further, the electron beam-curable resin used for forming the upper layer contained silica fine particles (particle size: 12 μm) having a particle size equal to or less than the coating film thickness in an amount of 10 parts by mass based on 100 parts by mass of the electron beam-curable resin, and contained silica fine particles (particle size: 20 μm) having a particle size greater than the coating film thickness in an amount of 10 parts by mass based on 100 parts by mass of the electron beam-curable resin. The thickness after curing was 30 μm (lower layer: 15 μm; and upper layer: 15 μm).

The surface-protecting layer formed in the above manner was heated with a non-contact-type infrared heater to thereby soften the base material sheet and the transparent resin layer; and embossing was immediately conducted by heat and pressure to form a wood-grain projection and depression pattern (wood-grain pattern 1) on the surface-protecting layer, thereby producing a decorative sheet.

Example 2

A decorative sheet was produced as in Example 1, except that the embossing was changed to a wood-grain projection and depression pattern (wood-grain pattern 2).

Example 3

A 60-μm-thick polypropylene film was prepared as a base material sheet. A back-surface primer layer (2 μm in thickness) was formed on the back surface of the base material sheet, and a 2-μm-thick picture pattern layer was formed by gravure printing on the front surface of the base material sheet. A 2-μm-thick transparent adhesive layer comprising a urethane-based resin was formed on the picture pattern layer. A 100-μm-thick transparent polypropylene-based resin sheet was laminated on the adhesive layer by an extrusion lamination method, thereby forming a transparent resin layer.

Subsequently, the surface was subjected to a corona discharge treatment, and then coated with a two-component curable urethane-based resin, thereby forming a primer layer (surface-protecting layer-forming primer layer; thickness: 2 μm).

The front surface of the primer layer was single-layer-coated with a urethane acrylate-based electron beam-curable resin (EB resin) by a gravure coating method so that the thickness after curing was 15 μm. Then, the electron beam-curable resin was cured by irradiation with an electron beam using an electron beam irradiation device in an environment with an oxygen concentration of 200 ppm or less at an acceleration voltage of 175 KeV with a dose of 5 Mrad, thereby forming a surface-protecting layer.

Further, the electron beam-curable resin used as above contained silica fine particles (particle size: 12 μm) having a particle size equal to or less than the coating film thickness in an amount of 10 parts by mass based on 100 parts by mass of the electron beam-curable resin, and contained silica fine particles (particle size: 20 μm) having a particle size greater than the coating film thickness in an amount of 10 parts by mass based on 100 parts by mass of the electron beam-curable resin.

The surface-protecting layer formed in the above manner was heated with a non-contact-type infrared heater to thereby soften the base material sheet and the transparent resin layer; and embossing was immediately conducted by heat and pressure to form a wood-grain projection and depression pattern (wood-grain pattern 3) on the surface-protecting layer, thereby producing a decorative sheet.

Example 4

A 100-μm-thick PET-G-based resin film was prepared as a base material sheet. A back-surface primer layer (2 μm in thickness) was formed on the back surface of the base material sheet, and a 2-μm-thick picture pattern layer was formed by gravure printing on the front surface of the base material sheet. A 2-μm-thick transparent adhesive layer comprising a urethane-based resin was formed on the picture pattern layer. A 100-μm-thick transparent PET-G-based resin film was laminated on the adhesive layer by a lamination method, thereby forming a transparent resin layer.

Subsequently, the surface was subjected to a corona discharge treatment, and then coated with a two-component curable urethane-based resin, thereby forming a primer layer (surface-protecting layer-forming primer layer; thickness: 2 μm).

The front surface of the primer layer was single-layer-coated with a urethane acrylate-based electron beam-curable resin (EB resin) by a gravure coating method so that the thickness after curing was 15 μm. Then, the electron beam-curable resin was cured by irradiation with an electron beam using an electron beam irradiation device in an environment with an oxygen concentration of 200 ppm or less at an acceleration voltage of 175 KeV with a dose of 5 Mrad, thereby forming a surface-protecting layer.

Further, the electron beam-curable resin used as above contained silica fine particles (particle size: 12 μm) having a particle size equal to or less than the coating film thickness in an amount of 10 parts by mass based on 100 parts by mass of the electron beam-curable resin, and contained silica fine particles (particle size: 20 μm) having a particle size greater than the coating film thickness in an amount of 10 parts by mass based on 100 parts by mass of the electron beam-curable resin.

The surface-protecting layer formed in the above manner was heated with a non-contact-type infrared heater to thereby soften the base material sheet and the transparent resin layer; and embossing was immediately conducted by heat and pressure to form a wood-grain projection and depression pattern (wood-grain pattern 1) on the surface-protecting layer, thereby producing a decorative sheet.

Comparative Example 1

A 60-μm-thick polypropylene film was prepared as a base material sheet. A back-surface primer layer (2 μm in thickness) was formed on the back surface of the base material sheet, and a 2-μm-thick picture pattern layer was formed by gravure printing on the front surface of the base material sheet. A 2-μm-thick transparent adhesive layer comprising a urethane-based resin was formed on the picture pattern layer. A 80-μm-thick transparent polypropylene-based resin sheet was laminated on the adhesive layer by an extrusion lamination method, thereby forming a transparent resin layer.

Subsequently, the surface was subjected to a corona discharge treatment, and then coated with a two-component curable urethane-based resin, thereby forming a primer layer (surface-protecting layer-forming primer layer; thickness: 2 μm).

The front surface of the primer layer was single-layer-coated with a urethane acrylate-based electron beam-curable resin (EB resin) by a gravure coating method so that the thickness after curing was 15 μm. Then, the electron beam-curable resin was cured by irradiation with an electron beam using an electron beam irradiation device in an environment with an oxygen concentration of 200 ppm or less at an acceleration voltage of 175 KeV with a dose of 5 Mrad, thereby forming a surface-protecting layer.

Further, the electron beam-curable resin used as above contained silica fine particles (particle size: 12 μm) having a particle size equal to or less than the coating film thickness in an amount of 10 parts by mass based on 100 parts by mass of the electron beam-curable resin, and contained silica fine particles (particle size: 20 μm) having a particle size greater than the coating film thickness in an amount of 10 parts by mass based on 100 parts by mass of the electron beam-curable resin.

The surface-protecting layer formed in the above manner was heated with a non-contact-type infrared heater to thereby soften the base material sheet and the transparent resin layer; and embossing was immediately conducted by heat and pressure to form a wood-grain projection and depression pattern (wood-grain pattern 4) on the surface-protecting layer, thereby producing a decorative sheet.

Comparative Example 2

A decorative sheet was produced as in Comparative Example 1, except that the embossing was changed to a wood-grain projection and depression pattern (wood-grain pattern 5).

Table 1 below shows the details of Examples 1 to 4, and Comparative Examples 1 and 2.

TABLE 1

| | | | Ex. 1 | Ex. 2 | Ex. 3 | Ex. 4 | Comp. Ex. 1 | Comp. Ex. 2 |
|---|---|---|---|---|---|---|---|---|
| Transparent resin layer | Type | | PP | PP | PP | PET-G | PP | PP |
| | Thickness (μm) | | 100 | 100 | 100 | 100 | 80 | 80 |
| EB coating layer | | (μm) | 30 | 30 | 15 | 15 | 15 | 15 |
| Embossing | | | Wood-grain pattern 1 | Wood-grain pattern 2 | Wood-grain pattern 3 | Wood-grain pattern 1 | Wood-grain pattern 4 | Wood-grain pattern 5 |

TABLE 1-continued

|  |  | Ex. 1 | Ex. 2 | Ex. 3 | Ex. 4 | Comp. Ex. 1 | Comp. Ex. 2 |
|---|---|---|---|---|---|---|---|
| Decorative sheet thickness (t) | (μm) | 198 | 198 | 183 | 223 | 163 | 163 |
| Surface shape Rzjis | (μm) | 78 | 118 | 87 | 80 | 28 | 51 |
| Rz (Depth of depression of projection and depression pattern (d)) | (μm) | 102 | 151 | 120 | 107 | 36 | 56 |
| Rp | (μm) | 43 | 72 | 58 | 48 | 12 | 28 |
| Ratio of depth of depression of projection and depression pattern (d) to decorative sheet thickness (t) (d/t) |  | 0.52 | 0.76 | 0.66 | 0.48 | 022 | 0.34 |
| Peak-valley average spacing (RSm) | (mm) | 1.01 | 1.15 | 0.70 | 0.80 | 0.79 | 1.37 |
| Ratio of peak-valley average spacing (RSm) to ten-point mean roughness (RSm/Rzjis) |  | 12.9 | 9.7 | 8.0 | 10.0 | 28.2 | 26.9 |

In Table 1, PP represents polypropylene, and PET-G represents PET synthesized by partially replacing ethylene glycol, which is a starting material of PET (polyethylene terephthalate), with cyclohexane dimethanol.

According to the cross-sectional photographs (not attached to this specification) of Example 2 (wood-grain pattern 2) and Comparative Example 1 (wood-grain pattern 4), a deep embossing of Rz=151 μm was present in Example 2, and the projection and depression pattern was clearly distinguishable. In contrast, an embossing of Rz=36 μm (embossing shallower than Example 2) was present in Comparative Example 1, and the projection and depression pattern was not clearly distinguishable.

Production of Decorative Plate

A 2.5-mm-thick medium-density wood fiberboard (hereinafter referred to as "MDF") was prepared as a decorative plate base material A. The decorative plate base material A had a hardness of 44 μm as the amount of dent when a 1-cm-diameter metal cylinder was pushed at 3 kg/cm$^2$ against the decorative plate base material.

A cork composite base material (a laminate of a 1-mm-thick cork sheet and 4-mm-thick MDF) was prepared as a decorative plate base material B. The decorative plate base material B had a hardness of 122 μm as the amount of dent when a 1-cm-diameter metal cylinder was pushed at 3 kg/cm$^2$ against the decorative plate base material.

An emulsion adhesive (two-component curable) was applied to the decorative plate base materials A and B (in B, the decorative sheet was bonded to the cork sheet side). Subsequently, each decorative sheet was roll-laminated thereon, and pressed at a pressure of 3 kg/cm$^2$ for 30 minutes; followed by curing at room temperature for two days, thereby producing decorative plates.

Test Example 1

Each decorative plate was subjected to tests for evaluating the exterior appearance (squashing of embossing, texture, and finished state (degree of the occurrence of daku)), scratch resistance, and slidability. The test methods were described below. The test results were shown in Table 2 (decorative plate base material A) and Table 3 (decorative plate base material B) below.

Surface Roughness Measurement

The measurement was performed using a SURFCOM FLEX-50A (produced by Tokyo Seimitsu Co. Ltd.).

Rzjis is a ten-point mean roughness (Rz94) specified in JIS B0601 (1994). The measurement was performed using the above measurement machine in accordance with JIS B0601 (2001).

Rp is a maximum peak height specified in JIS B0601 (2001).

Rz is a maximum height specified in JIS B0601 (2001).

RSm is a mean width of roughness profile elements specified in JIS B0601 (2001).

Squashing of Embossing

Squashing of embossing was evaluated by touching with hand the embossed projection and depression patterns of the decorative plates. More specifically, 15 adult men and women in their 20s to 40s evaluated the embossed projection and depression pattern of each of the decorative plates by touching with hand.

A: 10 or more adult men or women felt that embossing was not squashed.

C: those that did not correspond to A above.

Texture

The texture of the embossed projection and depression pattern of each decorative plate was evaluated by touching with hand. More specifically, 15 adult men and women in their 20s to 40s evaluated the texture of the embossed projection and depression pattern of each of the decorative plates by touching with hand.

A: Ten or more adult men or women had excellent feeling of projections and depressions.

B: Seven to nine adult men or women had excellent feeling of projections and depressions.

C: Did not correspond to A or B above.

Finished State (Degree of Occurrence of Daku)

The degree of occurrence of daku in the surface of each decorative plate was evaluated visually.

A: No unevenness was observed in the decorative plate base material.

B: Unevenness was slightly observed in the decorative plate base material (tolerable range).

C: Unevenness was clearly observed in the decorative plate base material.

Scratch Resistance

The Clemens hardness was measured based on JIS K 5600-5-5 (1990).

A diamond needle was used to scratch the test sample surface to determine the load at which a white scratch was formed on the surface of the test sample. The load was increased in increments of 10 g, and evaluated as A, B, or C according to the load at which a white scratch was formed.

A: 90 g or more

B: 60 to 80 g (tolerable range)

C: 50 g or less

Slidability

The actual measurement values of the coefficient of static friction of the test sample surfaces were measured while the contacting unit was coated with a plain-weave cotton fabric using a HEIDON TriboGear Muse (TYPE: 94i, produced by Shinto Scientific Co., Ltd.) portable friction meter.

TABLE 2

|  |  | Ex. 1 | Ex. 2 | Ex. 3 | Ex. 4 | Comp. Ex. 1 | Comp. Ex. 2 |
|---|---|---|---|---|---|---|---|
| Decorative sheet thickness (t) | (μm) | 198 | 198 | 183 | 223 | 163 | 163 |
| Surface shape | Rzjis (μm) | 64 | 104 | 76 | 78 | 25 | 25 |
|  | Rz (Depth of depression of projection and depression pattern (d)) (μm) | 84 | 142 | 109 | 99 | 33 | 34 |
|  | Rp (μm) | 36 | 65 | 53 | 47 | 12 | 16 |
| Ratio of depth of depression of projection and depression pattern (d) to decorative sheet thickness (t) (d/t) |  | 0.42 | 0.72 | 0.60 | 0.44 | 020 | 0.21 |
| Peak-valley average spacing (RSm) | (mm) | 1.01 | 1.07 | 0.70 | 0.87 | 0.74 | 1.06 |
| Ratio of peak-valley average spacing (RSm) to ten-point mean roughness (RSm/Rzjis) |  | 15.8 | 10.3 | 92 | 11.2 | 29.6 | 42.4 |
| Exterior appearance | Squashing of embossing | A | A | A | A | A | C |
|  | Texture | A | A | A | A | C | B |
|  | Finished state (daku) | A | A | A | A | A | A |
| Scratch resistance |  | A | A | B | B | B | B |
| Slidability | Flow direction | 0.46 | 0.47 | 0.47 | 0.47 | 0.43 | 0.41 |
|  | Width direction | 0.48 | 0.51 | 0.50 | 0.48 | 0.43 | 0.41 |

TABLE 3

|  |  | Ex. 1 | Ex. 2 | Ex. 3 | Ex. 4 | Comp. Ex. 1 | Comp. Ex. 2 |
|---|---|---|---|---|---|---|---|
| Decorative sheet thickness (t) | (μm) | 198 | 198 | 183 | 223 | 163 | 163 |
| Surface shape | Rzjis (μm) | 73 | 104 | 78 | 73 | 25 | 44 |
|  | Rz (Depth of depression of projection and depression pattern (d)) (μm) | 93 | 145 | 113 | 110 | 34 | 50 |
|  | Rp (μm) | 42 | 67 | 54 | 55 | 13 | 26 |
| Ratio of depth of depression of projection and depression pattern (d) to decorative sheet thickness (t) (d/t) |  | 0.47 | 0.73 | 0.62 | 0.49 | 021 | 0.31 |
| Peak-valley average spacing (RSm) | (mm) | 0.95 | 1.06 | 0.80 | 0.71 | 0.79 | 1.64 |
| Ratio of peak-valley average spacing (RSm) to ten-point mean roughness (RSm/Rzjis) |  | 13.0 | 102 | 10.3 | 9.7 | 31.6 | 37.3 |
| Exterior appearance | Squashing of embossing | A | A | A | A | A | A |
|  | Texture | A | A | A | A | C | A |
|  | Finished state (daku) | B | B | B | B | C | C |
| Scratch resistance |  | A | A | B | B | B | B |
| Slidability | Flow direction | 0.47 | 0.50 | 0.48 | 0.48 | 0.43 | 0.43 |
|  | Width direction | 0.49 | 0.52 | 0.50 | 0.49 | 0.44 | 0.42 |

As is clear from the results shown in Tables 2 and 3, although the decorative plates obtained by using the decorative sheets of Examples 1 to 4, which had a specific embossed projection and depression pattern specified in the present invention on the surface-protecting layer side, had a deep embossed shape, squashing of the embossed shape was suppressed when bonded to the adherend. Therefore, the texture based on the embossed shape was excellent, and the degree of the occurrence of daku was within the tolerable range in actual use.

In contrast, the decorative sheet of Comparative Example 1 originally had an embossed shape shallower than those of Examples 1 to 4; thus, squashing of the embossed shape was not observed when bonded to the adherend. However, since the embossing was shallow, the texture was not sufficient; and since the maximum profile peak height Rp was outside the stipulated range, the occurrence of daku was clearly observed when bonded to the soft decorative plate base material B.

Although the decorative sheet of Comparative Example 2 had an embossed shape shallower than those of Examples 1 to 4, this sheet had an Rzjis of 51 μm; thus, the embossing in this sheet is generally considered to be deep. The decorative sheet of Comparative Example 2 had a maximum profile peak height Rp outside the stipulated range. Therefore, squashing of the embossed shape was observed when the sheet was bonded to the hard decorative plate base material A, resulting in insufficient texture; and the occurrence of daku was clearly observed when the sheet was bonded to the soft decorative plate base material B.

The above results clarified that the embossed projection and depression pattern as specified in the present invention, including the maximum profile peak height Rp, is indispensable to achieve bonding to both hard adherends and soft adherends; ensure that the occurrence of daku is within the tolerable range; and show excellent designability including the texture based on the embossed shape.

DESCRIPTION OF REFERENCE SYMBOLS

1. Decorative Sheet
2. Base Material Sheet
3. Picture Pattern Layer
4. Transparent Resin Layer
5. Surface-Protecting Layer (Lower Layer)
6. Surface-Protecting Layer (Upper Layer)

7. Transparent Adhesive Layer
8. Primer Layer
9. Back-Surface Primer Layer
10. Decorative Plate Base
11. Decorative Plate
A. Fine Particles A
B. Fine Particles B
C. Projection of embossed projection and depression pattern
D. Depression of embossed projection and depression pattern
t. Thickness of decorative sheet
d. Depth of embossed pattern
T1. Thickness of transparent resin layer
T2. Thickness of surface-protecting layer

The invention claimed is:

1. A decorative sheet comprising a laminate sequentially including a base material sheet, a transparent resin layer, and a surface-protecting layer in the thickness direction, wherein
    (1) the decorative sheet has an embossed projection and depression pattern on the surface-protecting layer side,
    (2) projections of the embossed projection and depression pattern are rising portions successively connected to depressions, and are projected from a reference plane, the reference plane being a portion of the surface of the surface-protecting layer without the embossed projection and depression pattern,
    (3) cross-sectional shapes of the embossed projection and depression pattern have (a) a flat bottom and/or (d) a round bottom with the middle of the depression being roundly broadened, and
    (4) the surface of the surface-protecting layer has a maximum profile peak height Rp specified in JIS B0601 (2001) of 30 μm or more.

2. The decorative sheet according to claim 1, wherein the surface of the surface-protecting layer has a ten-point mean roughness Rzjis specified in JIS B0601 (1994) of 50 μm or more.

3. The decorative sheet according to claim 2, which satisfies a range of 0.4t≤d≤t, wherein t represents a thickness of the decorative sheet, and d represents a depth of the embossed projection and depression pattern.

4. The decorative sheet according to claim 2, wherein
    1) the surface-protecting layer, when consisting of a single layer, contains fine particles having a particle size greater than the thickness of the single layer, and
    2) the surface-protecting layer, when consisting of a multilayer, contains fine particles having a particle size greater than the thickness of the uppermost surface layer of the multilayer.

5. The decorative sheet according to claim 2, wherein the surface-protecting layer has a total thickness of 15 μm or more.

6. The decorative sheet according to claim 2, wherein the surface-protecting layer contains an ionizing radiation-curable resin.

7. The decorative sheet according to claim 2, wherein the base material sheet and the transparent resin layer contain a non-halogen-based thermoplastic resin.

8. The decorative sheet according to claim 2, wherein the surface of the surface-protecting layer has a ratio of a mean width of roughness profile elements RSm specified in JIS B0601 (2001) to the Rzjis, RSm/Rzjis, of 20 or less.

9. The decorative sheet according to claim 8, which satisfies a range of 0.4t≤d≤t, wherein t represents a thickness of the decorative sheet, and d represents a depth of the embossed projection and depression pattern.

10. The decorative sheet according to claim 8, wherein
    1) the surface-protecting layer, when consisting of a single layer, contains fine particles having a particle size greater than the thickness of the single layer, and
    2) the surface-protecting layer, when consisting of a multilayer, contains fine particles having a particle size greater than the thickness of the uppermost surface layer of the multilayer.

11. The decorative sheet according to claim 8, wherein the surface-protecting layer has a total thickness of 15 μm or more.

12. The decorative sheet according to claim 1, which satisfies a range of 0.4t≤d≤t, wherein t represents a thickness of the decorative sheet, and d represents a depth of the embossed projection and depression pattern.

13. The decorative sheet according to claim 1, wherein
    1) the surface-protecting layer, when consisting of a single layer, contains fine particles having a particle size greater than the thickness of the single layer, and
    2) the surface-protecting layer, when consisting of a multilayer, contains fine particles having a particle size greater than the thickness of the uppermost surface layer of the multilayer.

14. The decorative sheet according to claim 13, wherein the fine particles are in a form of a vesicle formed by a supercritical reverse phase evaporation method.

15. The decorative sheet according to claim 1, wherein the surface-protecting layer has a total thickness of 15 μm or more.

16. The decorative sheet according to claim 1, wherein the surface-protecting layer contains an ionizing radiation-curable resin.

17. The decorative sheet according to claim 1, wherein the base material sheet and the transparent resin layer contain a non-halogen-based thermoplastic resin.

18. The decorative sheet according to claim 17, wherein the non-halogen-based thermoplastic resin is an olefin-based thermoplastic resin.

19. A decorative plate comprising a laminate sequentially including a decorative plate base material and a decorative sheet in the thickness direction, wherein
    (1) the decorative sheet comprises a laminate sequentially including a base material sheet, a transparent resin layer, and a surface-protecting layer in the thickness direction,
    (2) the decorative sheet has an embossed projection and depression pattern on the surface-protecting layer side,
    (3) projections of the embossed projection and depression pattern are rising portions successively connected to depressions, and are projected from a reference plane, the reference plane being a portion of the surface of the surface-protecting layer without the embossed projection and depression pattern,
    (4) cross-sectional shapes of the embossed projection and depression pattern have (a) a flat bottom and/or (d) a round bottom with the middle of the depression being roundly broadened, and
    (5) the surface of the surface-protecting layer has a maximum profile peak height Rp specified in JIS B0601 (2001) of 30 μm or more.

20. The decorative plate according to claim 19, wherein the decorative plate base material is at least one member selected from the group consisting of medium-density wood fiberboards, high-density wood fiberboards, particleboards, coniferous tree plywood, broadleaf tree plywood, fast-growing tree plywood, cork sheets, cork-containing composite base materials, and thermoplastic resin base materials.

* * * * *